United States Patent [19]

Kuziemka et al.

[11] Patent Number: 5,079,398

[45] Date of Patent: Jan. 7, 1992

[54] CONTAINER WITH FERRITE COATING AND METHOD OF MAKING FERRITE-COATED SHEET

[75] Inventors: Edmund J. Kuziemka, Naperville, Ill.; Robert J. Petcavich, San Diego, Calif.

[73] Assignee: Pre Finish Metals Incorporated, Elk Grove Village, Ill.

[21] Appl. No.: 441,837

[22] Filed: Nov. 27, 1989

[51] Int. Cl.⁵ .............................................. B23K 15/10
[52] U.S. Cl. ........................ 219/10.55 E; 219/10.55; 219/10.55 F; 219/10.55 M; 219/10.55 R; 99/DIG. 14
[58] Field of Search ............... 219/10.55 E, 10.55 D, 219/10.55 R, 10.55 F, 10.55 M, 10.55 A; 99/DIG. 14; 426/124, 234, 241, 243; 156/230, 242

[56] References Cited

U.S. PATENT DOCUMENTS

| | | | |
|---|---|---|---|
| 2,582,174 | 1/1952 | Spencer | 219/10.55 E |
| 2,830,162 | 4/1958 | Copson et al. | 219/10.41 |
| 3,070,460 | 12/1962 | Huppke | 428/450 |
| 3,271,552 | 9/1966 | Krajewski | 219/10.55 |
| 3,591,751 | 7/1971 | Goltsos | 219/10.55 |
| 3,629,756 | 12/1971 | Heltz | 335/285 |
| 3,701,872 | 10/1972 | Levinson | 219/10.55 |
| 3,777,099 | 12/1973 | Levinson | 219/10.55 |
| 3,783,220 | 1/1974 | Tanizaki | 219/10.55 |
| 3,853,612 | 12/1974 | Spanoudis | 219/10.55 |
| 3,857,009 | 12/1974 | MacMaster et al. | 219/10.55 |
| 3,922,452 | 11/1975 | Forker et al. | 219/10.55 |
| 3,946,187 | 3/1976 | MacMaster et al. | 219/10.55 E |
| 3,946,188 | 3/1976 | Derby | 219/10.55 E |
| 4,003,840 | 1/1977 | Ishino et al. | 219/10.55 D |
| 4,046,983 | 9/1977 | Ishino et al. | 219/10.55 D |
| 4,116,906 | 9/1978 | Ishino et al. | 260/22 A |
| 4,190,757 | 2/1980 | Turpin et al. | 219/10.55 E |
| 4,230,924 | 10/1980 | Brastad et al. | 219/10.55 E |
| 4,266,108 | 5/1981 | Anderson et al. | 219/10.55 E |
| 4,267,420 | 5/1981 | Brastad | 219/10.55 E |
| 4,283,427 | 8/1981 | Winters et al. | 426/107 |
| 4,362,917 | 12/1982 | Freedman et al. | 219/10.55 E |
| 4,450,334 | 5/1984 | Bowen et al. | 219/10.55 E |
| 4,454,403 | 6/1984 | Teich et al. | 219/10.55 E |
| 4,486,640 | 12/1984 | Bowen et al. | 219/10.55 E |
| 4,496,815 | 1/1985 | Jorgensen | 219/10.55 E |
| 4,542,271 | 9/1985 | Tanonis et al. | 219/10.55 E |
| 4,592,914 | 6/1986 | Kuchenbecker | 219/10.55 E |
| 4,594,492 | 6/1986 | Maroszek | 219/10.55 E |
| 4,663,506 | 5/1987 | Bowen et al. | 219/10.55 E |
| 4,681,996 | 7/1987 | Collins et al. | 219/10.55 M |
| 4,689,458 | 8/1987 | Levendusky et al. | 219/10.55 E |
| 4,699,847 | 10/1987 | Nakayama et al. | 428/522 |
| 4,735,513 | 4/1988 | Watkins et al. | 219/10.55 E |
| 4,743,511 | 5/1988 | Sowman et al. | 428/547 |
| 4,806,718 | 2/1989 | Seaborne et al. | 219/10.55 E |
| 4,808,780 | 2/1989 | Seaborne | 219/10.55 E |
| 4,810,845 | 3/1989 | Seaborne | 219/10.55 E |
| 4,816,292 | 3/1989 | Machida | 427/38 |
| 4,818,831 | 4/1989 | Seaborne | 219/10.55 E |
| 4,917,748 | 4/1990 | Harrison | 219/10.55 E |
| 4,952,463 | 8/1990 | Atsushi | 428/552 |

*Primary Examiner*—Bruce A. Reynolds
*Assistant Examiner*—Tu Hoang
*Attorney, Agent, or Firm*—Emrich & Dithmar

[57] ABSTRACT

A container for baking and browning food when subjected to microwave energy and method of making same. A metal substrate has a ferrite-containing coating with a thickness between about 9.5 mils and about 10.5 mils on one surface and a coating on the other surface suitable for use in a microwave oven. The ferrite-containing coating includes a ferrite and a binder of epoxy resin and polyamide resin and plasticizer resin with the ratio by weight of ferrite to binder maintained between about 1.0 to about 1.8 to 1.0. The coated metal is cold drawn to provide a container suitable for heating various foods to a specified temperature in a short time. The coating is applied to the metal as a paint and then dried. Multiple thin coatings are applied to obtain the final thickness.

19 Claims, 1 Drawing Sheet

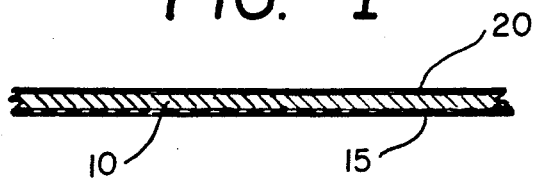
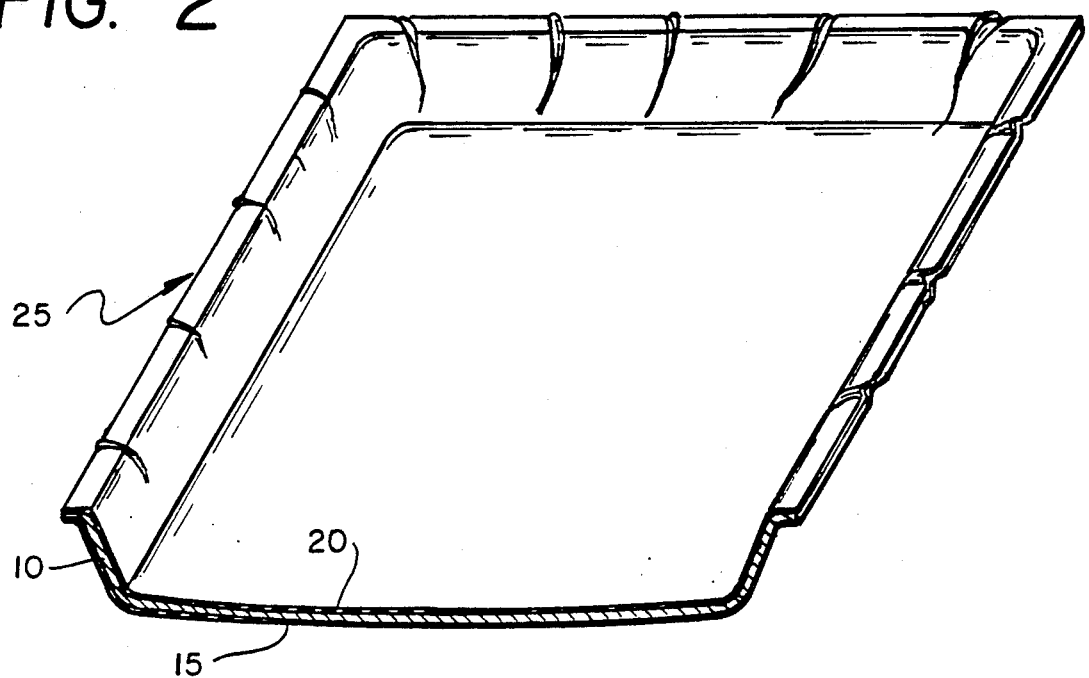
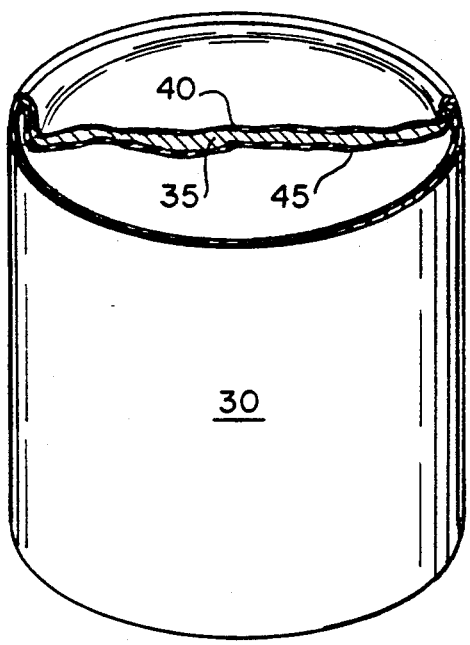

CONTAINER WITH FERRITE COATING AND METHOD OF MAKING FERRITE-COATED SHEET

BACKGROUND OF THE INVENTION

The present invention is directed toward dishes and related wares for use to bake, brown and warm food in microwave ovens. The method of manufacture of such wares is also a feature of the invention. More particularly, the present invention relates to ferrite-containing material in combination with specific binders along with a method of applying same to fast moving metal strips resulting in a material which may be cold drawn without fracture to the coating then or after subjecting the material to microwave energy.

The heating of food articles with microwave energy by consumers has now become commonplace. Such microwave heating provides advantages of speed and convenience. However, certain food items, such as breaded fish, when heated with microwave energy often results in a soggy texture to the food and fails to impart the desirable browning flavor and crispness of conventional heating ovens, partly due to retention of oil and moisture and also due to the inherent nature of microwave heating.

When microwave ovens were first marketed for home kitchen use, the customary experience was for the food to warm and cook but not the container. Although the container often became warm, this was due to conduction of heat from the food and therefore the dish was limited to the heat of the food or some temperature less. This is still the situation today where "conventional" microwave cooking is employed utilizing cooking wares that are not heated by exposure to microwave energy but rather indirectly, by the food.

Notwithstanding the past and existing experiences, there has been a recognition that the dish can also serve as a cooking surface for the food and, therefore, items have been developed which heat when subjected to microwave energy. This discovery was based on the phenomenon that some materials will absorb microwave energy, converting it to heat and these materials are said to be lossy as contrasted with transparent materials through which microwave energy passes without generation of heat. By making a cooking ware of a lossy material, food can be cooked on the surface or exterior by conduction as well as by absorbing microwave energy. The use of lossy materials for browning or crisping is well known in the art.

Basically, there are three approaches to providing browning and crisping in a microwave environment. The first approach is to include an electrically resistive film usually quite thin for instance, 0.00001 to 0.00002 cms applied to the surface of a non-conductor or non-lossy substrate. In the case of a permanent dish as opposed to a disposable dish, the containers are frequently ceramic, and with a disposable package, the substrate can be a polyester film. Heat is produced because of the $I^2R$ or resistive loss (see, for example U.S. Pat. Nos. 3,853,612, 3,922,452 and 3,783,220). Examples of disposable packing materials include metalized films such as those described in U.S. Pat. Nos. 4,594,492, 4,592,914, 4,590,349, 4,267,420 and 4,230,924.

The second category of microwave absorbing materials comprise electric conductors such as parallel rods or strips which function to produce an intense fringing electric field pattern which causes surface heating in an adjacent food. Examples include U.S. Pat. Nos. 3,271,552, 3,591,751, 3,857,009, 3,946,187 and 3,946,188. Such an approach is only taken with reusable utensils or dishes.

A third approach is to form articles from a mass or bed of particles that becomes hot in bulk when exposed to microwave energy. The microwave absorbing substance can be such composition are articles prepared therefrom include U.S. Pat. Nos. 2,582,174, 2,830,162 and 4,190,757. These materials can readily experience run away heating and immediately go to temperatures in excess of 1200° F. even with a food load to absorb the heat so generated. Some control over final heating temperatures is obtained by lowering so called Curie points of the materials by additions of dopants or selected binders. The Curie point is that temperature beyond which the material becomes transparent to microwave energy.

None of the prior art teaches how to formulate a material which can be adhered to a thin metal strip and thereafter cold drawn to provide an inexpensive and disposable food container which is capable in one embodiment, when subjected to microwave energy, of reaching food cooking temperatures of about 370°–400° F. in less than about 5 minutes and in another embodiment as a can for stew, soup or vegetables and the like which can reach food temperatures of about 120°–140° F. within about 3 minutes.

SUMMARY OF THE INVENTION

Accordingly, an object of the present invention is to provide an inexpensive ferrite-containing material suitable for browning, crisping or searing food within the disposable container or for rapidly heating stews, soups and vegetables in a disposable can formulated from the metal strip and to methods of making same, all the containers being capable of being cold drawn without delaminating, cracking or otherwise impairing the coating.

Another object of the invention is to provide an inexpensive ferrite-containing coating which may be applied to a rapidly moving metal strip so that the final ferrite-containing coating thickness on the metal strip is in the range of from about 1 to about 10 mils.

Another object of the present invention is to provide disposable containers for food having lossy materials which are inexpensive to manufacture, safe to use and well adapted for disposable containers useful for microwave cooking.

Another object of the present invention is to provide a container for baking, warming and browning food when subjected to microwave energy comprising a metal substrate, a ferrite-containing coating with a thickness in the range of from about 9.5 mils to about 10.5 mils on the outer surface of the metal substrate and a coating on the inner food-contacting surface thereof, the ferrite-containing coating including a ferrite and a binder of epoxy resin and polyamide resin and plasticizer resin wherein the ratio by weight of ferrite to binder is in the range of from about 1.5 to about 1.8 to 1.0, the ferrite-containing coating being sufficiently ductile to permit cold forming of the container without fracture of the coating.

Another object of the invention is to provide a container for warming, baking and browning food when subjected to microwave energy comprising a metal substrate, a ferrite-containing coating with a thickness in the range of from about 9.5 mils to about 10.5 mils on the outer surface thereof of the metal substrate and a coating on the inner food-contacting surface thereof, the ferrite-containing coating including a ferrite and a binder of epoxy resin and polyamide resin and plasticizer resin wherein the ratio by weight of ferrite to binder is in the range of from about 1.5 to 1.8 to 1.0, the ferrite containing $Fe_2O_3$ and the binder having a low molecular weight epoxy resin present in the range of from about 50% to about 70% by weight and having a polyamide resin with an amine value of less than about 400 present in the range of from about 20% to about 40% by weight and having a plasticizer resin present in the range of from about 5% to about 15% by weight, the ferrite-containing coating being sufficiently ductile to permit cold forming of the container from coated sheet material without fracture of the coating.

Another object of the invention is to provide a container for warming, baking and browning food contained therein when exposed to microwave energy comprising a tin-free steel substrate, a ferrite-containing coating with a thickness in the range of from about 1 to about 1.5 mils on the outer surface of the tin-free steel substrate, the ferrite-containing coating including a ferrite and a binder of an epoxy resin and a polyamide resin wherein the ratio by weight of ferrite to binder is about 1 to 1, the ferrite-containing coating being sufficiently ductile to permit cold forming the container without fracture of the coating.

A final object of the invention is to provide a method of applying a ferrite-containing coating to a moving strip of metal, comprising establishing a moving strip of metal, providing a liquid coating containing a ferrite and a binder and a solvent, the ferrite including $Fe_2O_3$ solids and the binder including an epoxy resin and a polyamide resin, the ferrite solids and the binder solids being dispersed in the solvent, the ratio of ferrite solids to binder solids being in the range of from about 1.0 to 1.8 to 1, applying a thin liquid coating of ferrite and binder and solvent to the metal and thereafter baking the thin coating at an elevated temperature to evaporate the solvent and solidify the coating, and repeatedly applying thin coatings and baking the coated metal strip until the total coating thickness is in the range of from about 1.0 to about 10.5 mils.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a transverse-sectional view of a strip of metal having a ferrite-containing coating on one side thereof and an FDA approved food contacting coating on the other side thereof;

FIG. 2 is a view of the strip shown in FIG. 1 after cold drawing to form a container; and FIG. 3 is a front elevational view of a can made out of a strip of metal of the type shown in FIG. 1.

DESCRIPTION OF THE PREFERRED EMBODIMENT

In its broadest statement, the invention as illustrated in FIG. 1 comprises a metal strip 10 which may be galvanized steel, aluminum of up to 25 mils or tin-free steel of about 5 to 10 mils having on one side thereof a ferrite-containing coating 15 and on the other side thereof a food contacting coating 20. FIG. 2 shows a pan or dish 25 manufactured by cold forming the metal strip previously illustrated in FIG. 1 to a depth of about ¾ inch. FIG. 3 illustrates yet another container in the form of a can 30 having a substrate of tin free steel 35 having a thickness of 0.0065 inches with a ferrite-containing coating 40 on the outer surface thereof and a food-contacting coating 45 on the inner surface thereof. Optionally, the ferrite-containing coating 40 may be overlayed with a white pigmented coating for aesthetic purposes such as a polyester having $TiO_2$ pigment therein.

Both U.S. Pat. No. 4,003,840 issued to Ichino et al. and U.S. Pat. No. 4,818,831 issued to Seaborne generally describe containers having a ferrite-containing overlay which may be useful in a disposable container for heating in a conventional microwave oven, that is one of 2450MHz. The compositions are useful because they heat relatively quickly, that is within 30 to 300 seconds to a final temperature in the range of from about 300° F. to about 800° F., depending on the particular material used. Nevertheless, it has been found that although the two referenced patents, the disclosures of which are herein incorporated by reference, may provide general descriptions of materials which are useful in coatings, most coatings, and there are literally an infinite number of varieties disclosed in the patents, are not capable of being cold drawn without fracture or delamination from the metal substrate.

It has been found, however, that a relatively small number of resins when combined in specific ratios and when applied in accordance with the method of the present invention, result in coatings which can be cold drawn without delamination or fracture and which serve the intended purpose to provide browning or rapid heating to the foods contained within the container. It should be understood that depending on the food which is contained within the container, the coating may be thinner or thicker, contain a greater or lesser concentration of ferrites in order to reach a higher or lower temperature depending upon the end product usage. Nevertheless, it has still been found that a precise combination of resins is necessary to provide a coated metal which can be cold formed, as required by the present invention.

Specifically, it has been found that shrimp and such foods which require food temperatures in the range of from about 300° F. to about 400° F. can be browned in a microwave in a container having a thin film with a thickness in a very narrow range and specifically in a range of from about 9.5 mils to about 10.5 mils, and the film must contain a specific ratio by weight of ferrite solids to binder solids. Further, it has been found that most resins are not suitable for the present invention and that a very limited number of resins in combination with only certain specific ferrite-containing materials are applicable. In general, it has been found that two specific ferrite-containing compounds provide the qualities which this invention is intended to meet. Specifically, a ferrite material containing $Fe_2O_3$ in combination with manganese and zinc has been found useful in providing a baking pan for shrimp and the like and an $Fe_2O_3$ in a much higher concentration is useful for fabricating a coating for cans containing soups, stews or vegetables. Specifically, the ferrite useful in manufacturing the container 25 of the present invention is a ferrite comprising 70 weight percent $Fe_2O_3$, 20 weight percent manganese and 10 weight percent zinc. The ferrite should be present in a ratio by weight of ferrite solids to binder solids in the range of from about 1.5 to 1.8 to 1. If the weight ratio of ferrite solids to binder solids is less than about 1.5 to 1, the container 25 will not heat to the required temperature to cook shrimp properly within about five minutes. Similarly, if the coating thickness is less than about 9.5 mils, rapid heating is not achieved. On the other hand, if the ratio of ferrite solids to binder solids is above 1.8 to 1 the coating becomes brittle and cannot be cold formed without fracture and loss of adhesion, thereby exposing the underlying metal for arcing in a microwave oven and subjecting the underlying metal to corrosion.

In addition, should the coating 15 be too thick, that is above 10.5 mils, a similar experience is incurred as if the ratio of ferrite solids to binder solids is excessive. Accordingly, it is necessary that the ratio of ferrite solids to binder solids ratio be closely controlled as well as the total coating thickness. In addition, as will be set forth below, a limited number of resins are applicable to the present invention and the coating must be applied in a specific manner.

In an example of the present invention, the cooking dish or shrimp boat 25 was constructed of 5 mil TFS (tin free steel) having a ferrite solids to binder solids of 1.5 to 1.0, wherein the ferrite solids were purchased from D.M. Steward Mfg. Co. of Chattanooga, Tennessee and consisted of 70% by weight $Fe_2O_3$ 20% by weight manganese and 10% by weight zinc. The resistivity of the ferrite powder was $3 \times 10^2$ ohms/cm. The Curie temperature was 200° C., the residual flux density in gausses was 1300, the saturation flux density in gausses was 5000 and the maximum permeability was 5500 with the initial permeability being 2700. The binder was 60% low molecular weight epoxy obtained from Shell Chemical Co. under the trade designation of Epon-Resin of 828. The Epon-Resin had a molecular weight of 380, a density in grams per milliliter at 20° C. of 1.168, a refractive index of 25° C. of 1.570-1.575 and a flash point greater than 175° F. The equivalent weight in grams of resin necessary to esterify one mole of acid with 85. The epoxy resin identified above is a light colored, epichlorohydrin-bisphenol A-type, low molecular weight epoxy resin. The chemical structure of a typical molecular of Epon-828 is:

450-550 and an hydroxyl cOntent equivalent OH/100 gms of resin of about 0.2 weight. In general, the epoxy resin (solids) should be present in the binder in the range of from about 50% by weight to about 70% weight, but preferably about 60% by weight. If the epoxy is present in an amount less than about 50% by weight, the coating is unsatisfactory and similarly, if the epoxy is present in an amount greater than about 70% by weight, the coating is also unsatisfactory. In some cases, the coating fails to adhere and in other cases the coating is too brittle and cracks upon cold forming or upon later microwaving. In general, the percent by weight as used in this application refers to the total resin solids, it being understood that the resins are often provided in liquid form so that the weights given in this application refer to the resin solids as opposed to a combination of the solids and solvents.

Also used in the binder is a polyamide which is present in the range of from about 20% by weight to about 40% by weight of the total resin solids. One useful polyamide is that manufactured by the Shell Chemical Co. and identified as V15X70having an amine value in the range of from about 230 to about 246 and an equivalent weight of about 240. Other polyamides may be used that have higher amine values in the range of from about 370 to about 400, but these amines have a much shorter pot life when mixed with the epoxy The preferred polyamide is present preferably in an amount of about 30% by weight and may be present in the range of from about 20% by weight to about 40% by weight.

The binder also contains a plasticizer which may be an epoxidized soybean oil manufactured by Rohm and Haas Co. identified as paraplex G-62 which is a high molecular weight soybean oil epoxide. ParaplexG-62 has a molecular weight of about 1000, a specific gravity at 25° C. of 0.993 and a viscosity in poises of 3.4. Paraplex G-62 has a refractive index of 1.471 and a freezing point in degrees fahrenheit of 41 and a flash point in degrees fahrenheit of 600. The acid number (mg KOH/g) is 0.4 and the saponification number (mg KOH/g) is 183. Preferably, the plasticizer is present in an amount in the range of from about 5% by weight to about 15% by weight of the total resin solids. Other plasticizers may be used provided that they are compatible with the epoxy and polyamide resins.

Various solvents are used to assist in forming a usable liquid paint and while the solvents in general may be widely varied, the preferred solvent for polyamide is xylol. In addition, aromatic 150, an aromatic (sc) hydrocarbon having a distillation range of from about 360 to about 410° F. may be added. Butyl cellusolve has a distillation range of from about 335° F. to 345° F. has been used.

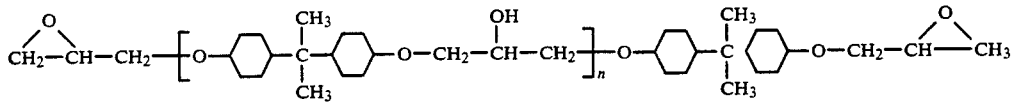

Alternatives to the Shell Epon-828 is a Ceiba Geigy low molecular epoxy resin designated 6010 or a Dow Chemical epoxy resin indicated 331. All of these resins have an epoxy equivalent weight of between about 180 to about 195 and a hydroxyl content, equivalent OH/100 gms. resin of about 0.06. In addition, another resin which may be used is the Shell Epon Resin designated 1001 or a Ceiba Geigy 7071 or a Dow Chemical 661. These resins have an epoxy equivalent weight of In one example, 241 pounds of Shell V15x70 polyamide resin were mixed with eighteen pounds of isophorone and 45 pounds of SC150 aromatic hydrocarbon solvent along with 880 pounds of Steward no. 33 ferrite powder which was identified above as 70% by weight $Fe_2O_3$, 20% by weight manganese and 10% by weight zinc. This material was stirred to form a liquid with the solids dispersed therethrough and thereafter added to 28 pounds of low molecular weight epoxy, Epon ® 828, 45 pounds of Paraplex G-62, 27 pounds of butyl cellosolve and 44 pounds of SC150. The materials were mixed to form a liquid paint and thereafter applied by roller to a strip of tin free steel travelling at a rate in the range of from about 125 to about 180 feet per minute. The coating was applied to an initial dry thicknesses of approximately 2.5 mils and after application the strip was transmitted through a dryer wherein the temperature was maintained at less than about 500° F. for a time sufficient to raise the metal temperature in the range of from about 420° F. to about 465° F. Higher temperatures caused the coating to be too hard resulting in fracture either on forming or on microwaving. However, drying at temperatures below about 420° F. results in coatings which are slightly tacky and which continue to react after the strip is wound into a coil.

Accordingly, it is necessary to dry the coating as aforesaid in order to remove the high boiling solvents in the paint formulation and to cause the epoxy resins and polyamide resins to react. It has also been found that if the coating is applied in thicknesses greater than about 2.5 mils the coating cracks and fractures result during either formation or microwaving. In order to obtain the desired coating thickness, the metal strip is run through the coating process two times (2 coats each time) in order to build up a total coating thickness in the range of from about 9.5 mils to about 10.5 mils. Thicknesses less than about 9.5 mils result in containers which do not heat up in the required five minutes to a temperature necessary to brown or crisp foods such as shrimp. Coatings in excess of 10.5 mils are too thick and crack or fracture either during cold forming or later microwaving. It should be noted that the container 25 has a cold draw of about ⅜ inch which requires a rather precise coating to be formed on the metal surface so as to ensure that the food is heated to the required temperature within five minutes or less and yet not be so thick as to result in fracture or cracking which renders the container inferior for microwave use.

An example of the coating 20 which is appropriate to be in contact with the food to be browned is as follows:

PIGMENT

A. Titanium dioxide at 1.0-1.0 pigment to binder solids ratio, on weight basis.
1. DuPont R900 or NL Industries Titanox 2020 are alternate sources.
2. Pigment can be at a lower concentration, as low as 0.7 pigment parts to 1.0 resin solids, low enough to provide opacity.
3. Other pigments can be used, such as, black and phtalocyanine blue alone, or with titanium dioxide to provide various colors.

RESIN (95% vinyl chloride, 9.5% paraplex G62, .5% silicone resin)

A. Vinyl chloride (86% vinyl chloride, 13% vinyl acetate, 1% maleic acid)
2. Union Carbide VMCH is an acceptable resin.
3. M.W. 21,000.
B. Paraplex G62 (epoxidized soybean oil) C.P. Hall
1. Heat stabilizer
2. Plasticizer
C. Silicone (linear polydimethyl siloxane fluid)
1. Terminal hydroxyls with silanol functionality.

2. Dow 1-9770 is an acceptable resin.
3. Used for release (non-stick) properties.
D. Applied at 0.5-0.7 mils dry thickness.

Various other combinations were tried without success for the ferrite coating 15, and a short listing of these unsuccessful attempts are hereafter listed. None of these combinations provided a coating which can be cold drawn and still produce the required heating characteristics of the present invention.

85% by weight of a polyester having a molecular weight of about 500 was combined with 7.5 percent urea formaldehyde, and 7.5 percent by weight melamine. This material failed. 80% acrylic was combined with 20% epoxy resin and applied as a paint and this material failed. 70% acrylic was combined with 30% epoxy resin resulting in a failed coating. 85% polyester having a molecular weight of about 1150 was combined with 15% by weight melamine which resulted in a coating which also failed. An oil modified polyester was combined with melamine in a polyvinyl chloride dispersion resin and applied as a painted coating which cracked during cold forming. 70% by weight low molecular weight epoxy resin was combined with 30% by weight polyamide having an amine value in the range of from about 350 to 400. This material was applied as a painted coating and failed. 80% by weight low molecular epoxy resin was combined with 20% by weight polyamide having an amine value in the range of from about 350 to about 400. This material after being applied as a painted coating also failed. 70% epoxy resin having a molecular weight of about 900 was combined with 30% by weight polyamide having an amine value in the range of from about 160 to 173 but this material failed as did a combination of 900 molecular weight epoxy with 460 molecular weight epoxy and a polyamide having an amine value in the range of from about 160 to 173.

Finally, a combination of 380 molecular weight epoxy resin with 460 molecular weight epoxy resin and polyamide also failed.

In another aspect of the invention, a can 30 can be manufactured from tin free steel in order to heat soups, stews or vegetables contained within the can in a microwave oven to a temperature in the range of from about 120° to about 140° F. within three minutes. The coatings for the can 30 have a dry film thickness in the range of from about 1.0 mils to about 1.5 mils and may be applied in two steps. A white polyester coating may be overlayed on the ferrite coating to provide a more attractive appearance but is unnecessary to the functioning of the invention. If present, the polyester coating has a thickness in the range of from about 0.7 to about 0.8 mils. The ferrite used with the can 30 is a 95% by weight $Fe_2O_3$ which has a much higher surface area and provides a much more viscous coatings than does the previously used ferrite of 70% $Fe_2O_3$ 20% Mn and 10% Zn.

In general, the ferrite (solids) to binder (solids) ratio for the can 30 is about 1 to 1. Epoxys and polyamides are useful in the binder and the binder may or may not have a plasticizer. In general, the epoxy which may be a combination of low molecular weight epoxys having a molecular weight of up to about 700 are present in the range of from about 50% by weight to about 80% by weight and the polyamides are present in the range of from about 20% by weight to about 50% by weight. If desirable, a plasticizer of the type hereinbefore specified may be added in the range of from about 5% by weight to about 10% by weight.

Coatings have been fabricated which are entirely satisfactory for the purposes of the invention and tested on the cans 30 as illustrated having epoxys present as 80% by weight and polyamides present in about 20% by weight. Also satisfactory coatings have been formulated of 50% epoxy, 45% polyamide and 5% plasticizer. In addition, suitable coatings have been fabricated of 70% epoxy and 30% by weight polyamides. For the can 30, the coatings were applied in two coats to provide a total coating thickness of about 1 to about 1.5 mils. The drying for the can 30 is similar to the container 25 but adjusted as is well within the skill of the art to accommodate the lower coating thickness.

As with container 25, numerous combinations of resins were tried without success. For instance, it was impossible to formulate an adequate coating using the 70% $Fe_2O_3$, 20% manganese and 10% zinc ferrite as was with the prior container 25. Also, high molecular weight epoxys were used and found not to be applicable.

Accordingly, it is seen that although a wide variety of resins have generally been stated in the prior art to be applicable to microwave heating with ferrites, in practice, when it is desired to cold draw the coated metal strip, most resins are inapplicable and only the combination of resins disclosed herein maintained in relatively narrow ratios of ferrite solids to binder solids result in coatings which are satisfactory, both in their adhesion characteristics and their from cold forming characteristics.

While there has been disclosed what is considered to be the preferred embodiment of the present invention, it is understood that various changes in the details may be made without departing from the spirit, or sacrificing any of the advantages of the present invention.

What is claimed is:

1. A container having bottom and side walls for warming, baking and browning food when subjected to microwave energy comprising a metal substrate having an inner food-contacting surface and an outer surface, a ferrite-containing coating with a thickness in the range of from about 9.5 mils to about 10.5 mils on the outer surface of said metal substrate and a coating on the inner food-contacting surface thereof, said ferrite-containing coating including a ferrite and a binder of epoxy resin and polyamide resin and plasticizer resin wherein the ratio by weight of ferrite solids to binder solids is in the range of from about 1.5 to 1.0 to about 1.8 to 1.0.

2. The container of claim 1, wherein said ferrite-coating includes a ferrite having $Fe_2O_3$ present in a concentration of about 70% by weight.

3. The container of claim 2, wherein said ferrite contains by weight about 70% $Fe_2O_3$ and about 20% manganese and about 10% zinc.

4. The container of claim 2, wherein the entire outer surface of said container is covered by said ferrite-containing coating and the entire inner food contacting surface of said container is covered by said coating to prevent direct exposure of said metal substrate to the microwave energy.

5. The container of claim 2, wherein said binder contains low molecular weight epoxy resin of an epichlorohydrin-bisphenol A-type.

6. The container of claim 5, wherein the epoxy resin has a molecular weight of less than about 700.

7. The container of claim 5, wherein the epoxy resin has a molecular weight of about 380.

8. The container of claim 1, wherein said binder contains an epoxy resin having a molecular weight of about 380 and a plasticizer of an epoxidized soy bean oil having a molecular weight of about 1000.

9. The container of claim 8, wherein said binder contains by weight of from about 50% to about 70% epoxy resin and from about 20% to about 40% polyamide resin and from about 5% to about 15% plasticizer resin.

10. The container of claim 9, wherein said binder contains by weight about 60% epoxy resin and about 30% polyamide resin and about 10% plasticizer.

11. A container having bottom and side walls for warming, baking and browning food when subjected to a microwave energy comprising a metal substrate having an inner food-contacting surface and an outer surface, a ferrite-containing coating with a thickness in the range of from about 9.7 mils to about 10 mils on the outer surface of said metal substrate, said ferrite-containing coating including a ferrite and a binder of epoxy resin and polyamide resin and plasticizer resin wherein the ratio by weight of ferrite solids to binder solids is in the range of from about 1.5 to 1.0 to about 1.8 to 1.0, said ferrite containing $Fe_2O_3$ and said binder having a low molecular weight epoxy resin present in the range of from about 50% to about 70% by weight and having a polyamide resin present in the range of from about 20% to about 40% by weight and having the plasticizer resin present in the range of from about 5% to about 15% by weight.

12. The container of claim 11, wherein the ferrite is bout 70% by weight $Fe_2O_3$ and about 20% by weight manganese nd about 10% by weight zinc.

13. The container of claim 12, wherein the epoxy has a molecular weight of less than about 400 and the amine value of said polyamide is less than about 250 in molecular weight.

14. A container having bottom and side walls for warming, baking and browning food contained therein when exposed to microwave energy comprising a tin-free steel substrate having an inner food-contacting surface and an outer surface, a ferrite-containing coating with a thickness in the range of from about 1 to about 1.5 mils on the outer surface of said tin-free steel substrate, said ferrite-containing coating including a ferrite and a binder of an epoxy resin and a polyamide resin wherein the ratio by weight of ferrite solids to binder solids is about 1 to 1.

15. The container of claim 14, wherein the ferrite is 95% by weight $Fe_2O_3$.

16. The container of claim 14, wherein the epoxy resin is present in the binder in the range of from about 50% to about 80% by weight.

17. The container of claim 14, wherein the polyamide resin is present in the binder in the range of from about 20% to about 45% by weight.

18. The container of claim 14, wherein said binder contains a plasticizer resin present in the range of from about 5% to about 10% by weight.

19. The container of claim 14, wherein said epoxy resin is a low molecular weight resin present in the amount of about 50% by weight, the polyamide resin is present in the amount of about 45% by weight and the plasticizer resin is an epoxidized soy bean oil having a molecular weight of about 1000 and is present in the amount of about 5% by weight of the binder.

* * * * *